W. W. HOOPS.
AUTOMOBILE BODY.
APPLICATION FILED JAN. 29, 1917.
1,297,467.
Patented Mar. 18, 1919.
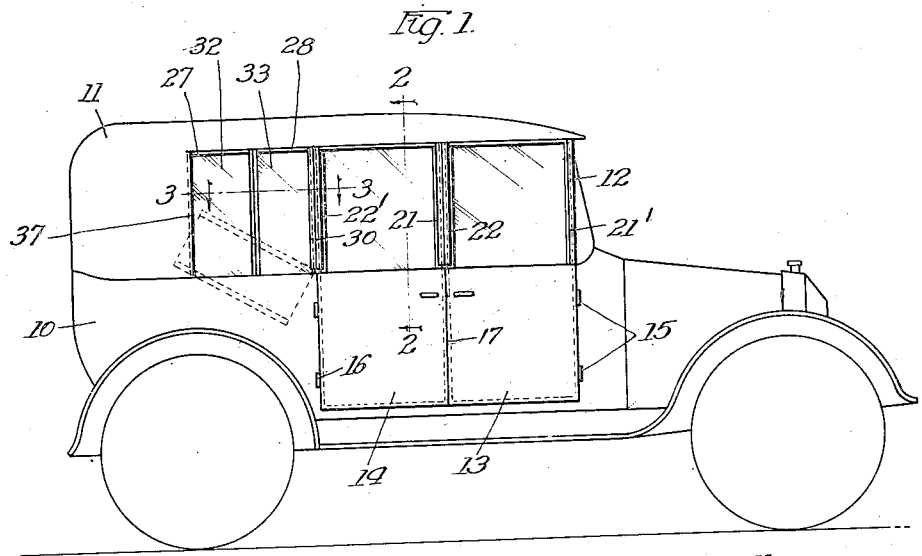
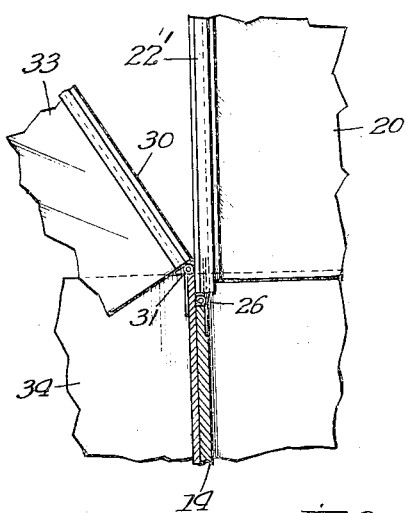
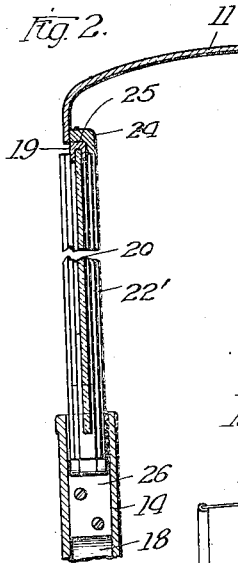
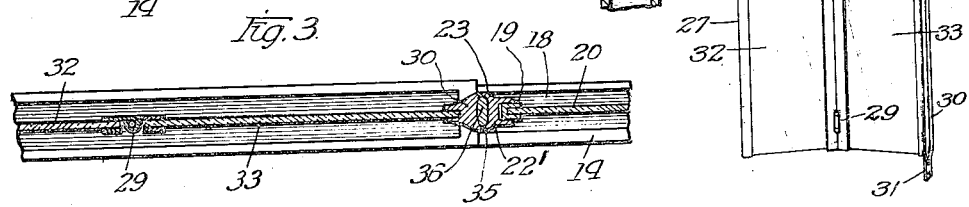
Witnesses:
Robert N. Weir
Arthur W. Carlson
Inventor
Walter W. Hoops
James R. Offield, Atty.

UNITED STATES PATENT OFFICE.

WALTER W. HOOPS, OF CHICAGO, ILLINOIS.

AUTOMOBILE-BODY.

1,297,467.　　　　Specification of Letters Patent.　　Patented Mar. 18, 1919.

Application filed January 29, 1917. Serial No. 145,107.

*To all whom it may concern:*

Be it known that I, WALTER W. HOOPS, a citizen of the United States, and a resident of Chicago, in the county of Cook and State of Illinois, have invented certain new and useful Improvements in Automobile-Bodies, of which the following is a specification.

My invention relates to automobile bodies, particularly to improved means to be associated with either a fixed or collapsible top to inclose the sides or to leave the sides wide open.

In cars of the limousine type ordinary windows are provided for opening and closing the sides, but when such windows are open vertical frame bars remain in place and more or less obstruct the view and make the vehicle still seem more like an inclosed vehicle than like an open one. In touring cars with collapsible tops the only means of inclosing the sides is by a removable frame in winter, or more usually by removable curtains, which may be folded up and stored away. Of late years so-called convertible bodies with permanent tops have been provided for vehicles, such tops being supported only at the rear from the vehicle frame, and at the front from the wind-shield, the sides being inclosed by removable framed windows and removable posts, or removable windows without posts which, when removed, leave the sides entirely unobstructed and open. The objection to this form of automobile body is that such a top can not be lowered for pleasant weather, and that such removable windows and posts must be actually removed and stored away in some compartment of the body.

In general the object of my invention is to provide a convertible body which may be built with either a fixed or collapsible top, the sides of the said body being inclosed with glass or other transparent material in frames, said frames to be readily telescoped or folded into the sides of the body, leaving the sides of the car entirely unobstructed and open, and which frames in their "up" position inclose the sides of the car and are supported by folding posts which do not have to be removed and stored away.

More in detail, the object of the invention is to provide window-pane supporting sashes adapted to be contained within the vehicle body frame or doors, and to provide hinged side frame parts normally forming top closures for the frame spaces containing the sashes, and which can be raised into vertical position to form vertical guide ways for the sashes to enable them to be raised into position to close the vehicle sides, and which hinged parts act both as window supports and door stops without the necessity for posts.

The various features of my invention are clearly shown on the accompanying drawings in which—

Figure 1 is a side elevational viewa of a veicle showing my improved inclosure arrangement applied thereto in a certain manner.

Fig. 2 is an enlarged sectional view on plane 2—2, Fig. 1.

Fig. 3 is an enlarged sectional view on plane 3—3, Fig. 1.

Fig. 4 is an enlarged side elevational view of part of the vehicle body partly in section, and showing one of the sashes being moved to open position.

Fig. 5 is an enlarged perspective view of a folding sash.

Referring to Fig. 1, 10 represents the vehicle body, and 11 the top either fixed or collapsible, which is supported at the rear on the body and at its front is supported on the wind-shield structure 12. On each side of the body, front and rear doors 13 and 14 are provided, the front doors in the construction shown being hinged at their front edges to the body as indicated at 15, and the rear doors being hinged at their rear edges to the body as indicated at 16. The manner of hinging the doors as indicated may be changed in any way desired, so that the doors are hinged at their front edges, or at their rear edges, or at their adjacent edges without affecting the working of my invention. Each door is hollow to form a receiving chamber 18 for a sash 19 supporting a glass pane 20. At the adjacent upper corners of the doors are provided hinged guide bars 21 and 22. There may also be used on the further edges of the doors hinged guide bars 21' and 22'. These guide bars have longitudinal grooves 23 which, when the bars are raised into vertical position, are in line to receive the sides of the respective window sash so that the sash may be raised to bring the pane between the top of the door and the top 11, the lower edge of the top being preferably surrounded by a sill 24 against which the guide bars extend and which sill has the groove 25 for receiving the upper end of the sash, (see Fig. 2). One of the side bars for each door, when two bars are used, is preferably hinged to the door edge below the hinging point of the other bar, and this lower hinged bar is of a width to extend into the door space when the sash is lowered therein, the higher bar being of a width to enter the door compartment above the other bar, or of a width to overhang the door top and form a closure therefor when the window sash is lowered. As shown in Fig. 2, the rear guide bar 22' of the door 14 is secured to the hinge 26 whose pivot is below that of the hinged pivot of the bar 21 for door 14. When the sash for door 14 is dropped with its upper edge below the hinge 26 the bar 22' is swung forwardly and downwardly and into horizontal position within the door space 18, and then the bar 21, which is hinged higher than bar 22', is swung down to horizontal position to close the upper end of the door space.

Where the width of the doors is substantially equal to the distance between the doors and the vehicle top, the guide bars when swung down will extend entirely across the respective door tops and may form the top finish for the doors. In the arrangement shown in Fig. 1, the rear and front bars respectively for the doors 13 and 14 will be back to back when they are raised and in order to form a tight weather-proof connection when the bars are raised the backs of these bars may be faced with yielding weather strips. Likewise, the guide bars, which when raised abut against the windshield structure 12, have their backs provided with weather strip material. On the top bars the material may be leather faced so as to form a neat leather finish top for the doors when these bars are in down position after dropping of the window sashes.

In Fig. 1. the top sides are open above the body in rear of the doors 14 and provision is also made to close these openings. However, as there is not sufficient space within the vehicle body below these openings for receiving integral sashes, I preferably subdivide the sashes. As best shown in Figs. 1 and 5, each sash structure comprises two vertical sash sections 27 and 28 hinged together at their inner edges as indicated at 29. The sash side 30 is hinged at its lower end to the vehicle body as indicated at 31 so that when the window section 32 is swung against the section 33, the folded structure can be dropped rearwardly and downwardly into the space 34 in the vehicle body, the sash bar 30 then closing the top of this space 34. Where the opening is not too wide window section 33 may be used alone without 32. To close the windows the bar 30 is raised to vertical position and the window section 32 is swung into the plane of section 33. When the bars 30 are in vertical position they engage back to back with the raised guide bars 22' for the rear doors 14. In Fig. 3 the bars 22' have retaining pockets 35 for weather strips 36 of felt, rubber or other suitable material, and the backs of the bars 30 are transversely concave to form seating for the strips. Thus when the various bars are raised to vertical position the intermediate bars will be back to back against each other, and the front bars will abut against the wind-shield structure, while the rear edges of the window sections 32 will abut against the vertical edges 37 of the vehicle top. When the windows are up the vehicle will be entirely inclosed and will have the appearance of a limousine. One or more, or all of the windows can be quickly lowered out of the way into the spaces provided therefor and their guide bars lowered to horizontal position, and when all the bars are down the vehicle sides are entirely open and the closed bars form neat top closures for the window sash receiving spaces in the doors and the vehicle body. When the windows are up the doors can readily be opened and closed in the ordinary manner.

The hinges employed for hinging the various guide bars to the doors or vehicle body are preferably of such a nature as to permit swinging of the bars only to vertical position and then to block further swing thereof. With this arrangement when a sash is raised between the bars either fully or partially, the bars will be locked in vertical position and the doors can readily be opened or closed.

I do not, of course, desire to be limited to the exact constructions and arrangement herein shown and described as changes and modifications are no doubt possible which would still come within the scope of the invention.

I claim as follows:

1. A vehicle body comprising, in combination, a body, two doors on one side thereof and hinged thereto, guide bars attached to adjacent edges of said doors, windows movably secured to said doors, said guide bars serving as guides and supports for said windows when in raised position and the doors opened and closing the margin between said windows when the doors are closed.

2. In a vehicle, the combination with a vehicle body and vehicle top, said body having a pocket, of a bar hinged at its lower end adjacent the top of said pocket to be swung into horizontal position or into vertical position to extend between said body and vehicle top, a folding window pane structure secured at one edge to said bar to extend between said body and vehicle top when unfolded and when said bar is raised and to extend into said pocket when folded and said bar is lowered.

3. In a vehicle, the combination with a vehicle body and vehicle top, said body having a pocket, of a bar hinged at its lower end adjacent the top of said pocket to be swung into horizontal position or into vertical position to extend between said body and vehicle top, a folding window pane structure secured at one edge to said bar to extend between said body and vehicle top when unfolded and when said bar is raised and to extend into said pocket when folded and said bar is lowered, said bar when lowered forming a closure for the top of said pocket.

In witness whereof I hereunto subscribe my name this 26th day of January, A. D. 1917.

WALTER W. HOOPS.